F. HOLLICK.
Vehicle-Wheel.
No. 214,135. Patented April 8, 1879.
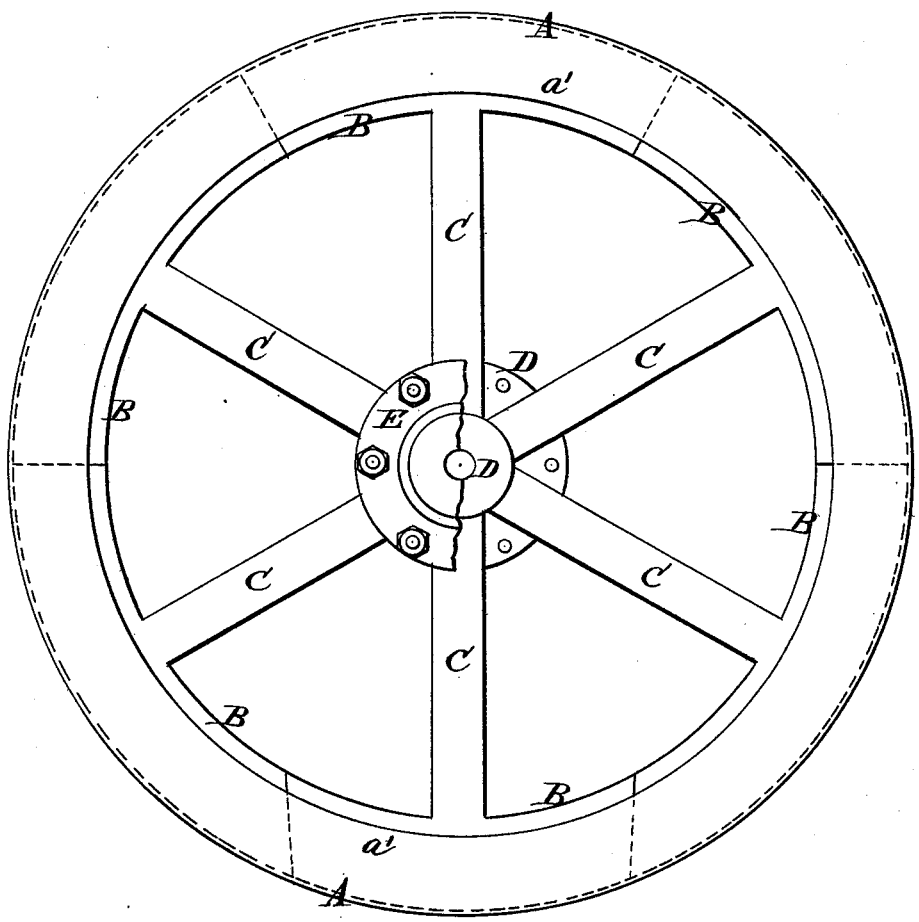
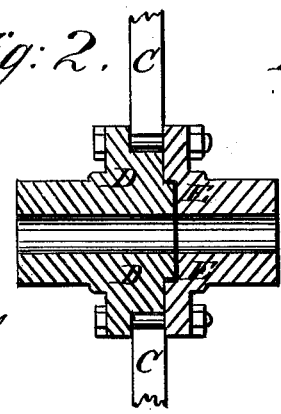 

UNITED STATES PATENT OFFICE.

FREDERICK HOLLICK, OF NEW YORK, N. Y.

IMPROVEMENT IN VEHICLE-WHEELS.

Specification forming part of Letters Patent No. 214,135, dated April 8, 1879; application filed February 10, 1879.

*To all whom it may concern:*

Be it known that I, FREDERICK HOLLICK, of the city, county, and State of New York, have invented a new and useful Improvement in Carriage-Wheels, of which the following is a specification.

Figure 1 is a side view of one of my improved wheels, part being broken away to show the construction. Fig. 2 is a detail section of the hub. Fig. 3 is a detail section of the rim.

Similar letters of reference indicate corresponding parts.

The object of this invention is to furnish an improved carriage-wheel which shall be so constructed that it may be readily put together and taken apart, which shall be simpler in construction, less expensive in manufacture, stronger, and more durable than wheels constructed in the usual way.

The invention consists in a vehicle-wheel whose tire is flanged, the fellies provided with central radial spokes, and the hub divided into two transverse sections, one of the fellies being so shaped on the ends with respect to the ends of two adjacent ones that they may be wedged in, as hereinafter described.

A represents the tire, which is made in one or more pieces, and of cast or wrought metal. The tire A is made with flanges $a'$ upon its side edges, to overlap the sides of the fellies B, as shown in Figs. 1 and 3, so as to keep the said tire in place.

Each felly B is attached to the outer ends of one or more spokes, C. One of the fellies B has its ends beveled in opposite directions, making it wedge-shaped, the ends of the adjacent fellies being beveled correspondingly. The other points of the rim are radial, as shown in Fig. 1.

The inner ends of the spokes C are placed in notches in the shoulder of the part D of the hub, where they are secured in place by the other part, E, of the said hub, which part may be made in the form of a ring-plate, if desired. The parts D E of the hub are secured to each other by bolts.

The wheel is put together by inserting the fellies B in the box or groove of the tire A $a'$, placing the inner ends of the spokes C in the notches in the part D of the hub, and bolting the part E to its place.

The tire A $a'$ may be heated before the fellies B are placed in it, so that the wheel may be tightened by the shrinking of the tire; or the wheel may be tightened by driving the wedge felly B into place, and thus pressing the fellies together within the box of the tire A. The flanges $a'$ of the tire A may be made of any desired depth, and may be plain or scalloped, or otherwise ornamental.

The flanges $a'$ may also be made with projections to overlap the sides of the outer ends of the spokes C, so as to strengthen the connection between them and the fellies.

This construction allows spokes to be placed at the joints of the fellies, so as to strengthen the rim of the wheel at its weakest points.

Having thus described my invention, I claim as new and desire to secure by Letters Patent—

A vehicle-wheel consisting of a tire having the flanges $a'$ $a'$, the fellies with radial spokes C, and the two-part hub D E, one of the fellies being bevel-edged and wedged between the oppositely-beveled edges of two adjacent fellies, as shown and described.

FREDERICK HOLLICK.

Witnesses:
JAMES T. GRAHAM,
C. SEDGWICK.